UNITED STATES PATENT OFFICE.

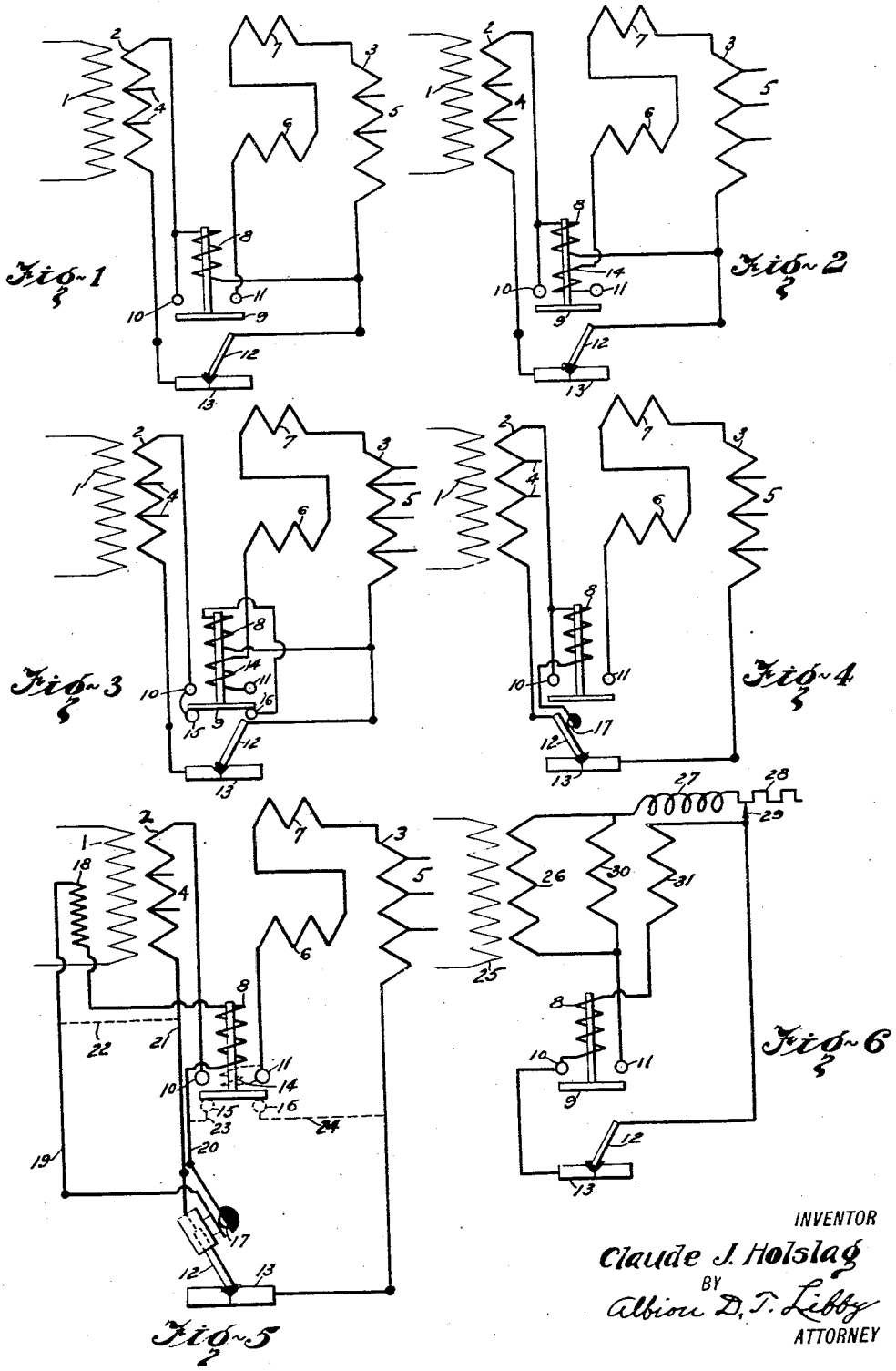

CLAUDE J. HOLSLAG, OF SOUTH ORANGE, NEW JERSEY.

WELDING SYSTEM.

1,354,398.  Specification of Letters Patent.  Patented Sept. 28, 1920.

Application filed December 13, 1919. Serial No. 344,647.

*To all whom it may concern:*

Be it known that I, CLAUDE J. HOLSLAG, a citizen of the United States, residing at South Orange, in the county of Essex, State of New Jersey, have invented certain new and useful Improvements in Welding Systems, of which the following is a description, reference being had to the accompanying drawing and to the figures of reference marked thereon.

This invention relates to improvements in metallic arc welding systems and has for its principal object means for reducing the open circuit voltage which is applied to the welding handle that carries the movable electrode. In many installations, such as on board a ship the cables from the welding machine are usually strung along the deck or the sides of the vessel, which in many cases are of steel and in hot weather when the workmen perspire a great deal disagreeable shocks are obtained by the operators if the open circuit voltage applied to the welding tool is above a certain value. This predetermined value, of course, varies with different individuals as what would be a shock to one would hardly be noticed by another and it is the object of this invention to reduce the applied voltage to the welding tool to a value which will not shock sensitive persons.

It is another object of my invention to provide the above mentioned means by means of a small and comparatively inexpensive device, arranging the same in a system so as to reduce the cost of installation and maintenance of the device itself.

Other and further objects will be apparent to one skilled in the art.

In order to illustrate the application of my invention, I have chosen to show it in connection with a welding machine, same as shown in my Patent No. 1,305,363.

In the drawing attached to this specification, I have shown various arrangements in a more or less diagrammatic manner in which—

Figure 1 shows an alternating current welding transformer having a contactor switch so arranged as to cut off part of the open circuit voltage from the welding electrodes.

Fig. 2 is the same as Fig. 1 but with a series winding attached to the contactor switch.

Fig. 3 is a modification of the arrangement shown in Fig. 2.

Fig. 4 shows an arrangement similar to that shown in Fig. 1 but in which the contactor switch is operated by a push button at the welding handle.

Fig. 5 shows another arrangement, while Fig. 6 shows the application of my invention to a different welding system than that shown in Figs. 1 to 5 inclusive.

Referring now to the details wherein like numbers refer to corresponding parts in the various views, 1 illustrates the primary of a transformer having a main secondary winding 2 and an auxiliary secondary winding 3, both of which have taps 4 and 5 as described in my patent previously referred to. 6 and 7 are steadying windings, such as shown and described in my patent previously referred to. In the welding system illustrated in Fig. 1, the open circuit voltage, should the windings 2, 6, 7 and 3 be connected together in the usual manner, would be in the neighborhood of 100. In order to reduce this voltage as applied to the welding electrodes, I have introduced a contactor switch consisting of a winding 8, switch member 9 adapted to engage contacts 10 and 11, contact 10 being connected to one terminal of the winding 2 which terminal, it is to be understood, may be shifted to any of the taps 4 while the contact 11 is connected to one of the steadying windings 6. One terminal of the winding 8 is connected to a wire leading from the contact 10 to the end of main secondary 2 while the other terminal of winding 8 is connected to the lead attached to the auxiliary secondary 3 or one of the taps 5. When the electrode 12 makes contact with the work 13 winding 8 is energized and the switch member 9 connects contacts 10 and 11 thereby applying the resultant voltage of the various secondary windings to the working electrodes and welding operations can then be proceeded with as usual. Before the switch contacts 10 and 11 are joined together by the switch member 9, it is seen that the voltage applied to the electrodes will be only that generated by the main secondary 2 which is only about 50 or less.

In Fig. 2, I have introduced a series winding 14 for the purpose of assisting in holding the contactor switch closed after the same has been drawn up by the winding 8 as previously described with reference to Fig. 1.

In Fig. 3, I have shown an arrangement for cutting out the winding 8 on the operation of the contact switch which is held in closed position by current through the coil 14. In this case the coil 8 is only used to draw up the switch member 9 away from the contacts 15 and 16 which are used to normally hold the coil 8 in circuit during the first period of striking the arc with the movable electrode 12. In Fig. 4 the coil 8 is operated by means of a push button 17 contacting with a portion of the welding tool. With this arrangement, it will be seen that the current may be cut off the electrode 12 and work 13 by means of opening the switch 17 previous to the putting out of the arc at the electrodes which would happen when the metal electrode 12 has been used up to a point adjacent the welding tool or on reaching the end of the operation. This is sometimes advisable as it has been found there is a tendency for the arc to burn the metal when withdrawing the electrode itself. It may be seen by this arrangement that the voltage applied to the welding handle is the same as in the other case, that is, the voltage of the main secondary coil.

In Fig. 5, I have arranged a special winding 18 on the core of the transformer, preferably closely adjacent the primary 1 and I have connected this winding to the winding 8 of the contactor switch which is operated by a push button 17 of the welding handle the same as arrangement shown in Fig. 4. This arrangement is such, however, that the voltage generated by the winding 18 is considerably less than that generated by the main secondary winding 2 on open circuit and consequently the voltage applied to the welding handle on open circuit is much lower than in the arrangement previously described. In order to simplify the welding tool and avoid running the wires 19 and 20 to the switch 17 I may connect the wire 19 to the wire 21 from the main secondary 2 as shown by the dotted lines 22 right at the transformer and the wire 20 from the winding 8 may be connected as shown in dotted lines 23 to a contact 15 and contact 16 may be connected as by wire 24 shown in dotted lines, to the end of the lead coming from the auxiliary secondary winding 3 of the transformer. It shall be understood that the contactor switch in each case is mounted on or within the transformer itself. Where the connections are used as shown in dotted lines Fig. 5, I use a series winding 14 having one end connected to the contact 11 and the other end to the steadying winding 6 which in this latter case then would not be connected to the contact 11.

In Fig. 6, I have shown an ordinary transformer having a primary winding 25 and secondary winding 26 one terminal of which is connected to a reactance coil 27 which in turn is connected to a steadying resistance coil 28. Adjustably connected to the resistance coil 28 is a terminal 29 which is fastened to the movable electrode 12. An auxiliary transformer having a primary winding 30 is connected across the secondary 26 of the main supply transformer. The auxiliary transformer has a secondary winding 31 having one terminal connected to the wires leading to the movable electrode 12 and the other end connected to the winding 8 of the contactor switch. By this arrangement it is seen that the voltage applied to the welding electrodes on open circuit is that delivered by the secondary winding 31 of the auxiliary transformer which may be of small size and of just sufficient voltage to operate the contactor switch so that the voltage applied to the electrodes will be about the same as that illustrated in Fig. 5, it being assumed that the contactor switch is of substantially the same sensitiveness.

While I have shown the application of my invention to alternating current welding systems, I do not wish to be limited to such systems, as it will be understood by one skilled in the art that the contactor switch may be used with other arrangements for the same purposes. It will also be apparent that the exact method of connecting the contactor switch into the system is susceptible of considerable variations, some of which variations are indicated in the drawings.

Having thus described my invention, what I claim is:—

1. In an arc welding system including a movable electrode and utilizing a source of current having a relatively high open circuit voltage, means for reducing the open circuit voltage normally applied to the movable electrode, consisting of a switch having an electromagnetic winding and having contacts disposed in the welding circuit but normally holding the said circuit open at a point such that only a portion in value of the open circuit voltage is on the movable electrode and means for energizing said winding to operate said switch whereby the arc may be established at the electrodes.

2. In an arc welding system including a movable electrode and a source of current having a relatively high open circuit voltage, means for reducing the open voltage normally applied to the movable electrode, consisting of a switch having an electromagnetic winding adapted to be energized by current delivered at a voltage much below the open circuit voltage, said switch having contacts normally holding the welding circuit open at a point such that only a portion in value of the open circuit voltage is on the movable electrode and means for energizing said winding to operate said switch whereby said contacts are electrically connected and an arc may be established at the electrodes.

3. In an arc welding system including a movable electrode and a source of current having a relatively high open circuit voltage, means for reducing the open circuit voltage normally applied to the movable electrode, consisting of a switch having an electromagnetic winding adapted to be energized by current delivered at a voltage much below the open circuit voltage, said switch having contacts normally holding the welding circuit open at a point such that only a portion in value of the open circuit voltage is on the movable electrode and means for energizing said winding when said movable electrode is brought in contact with the work, whereby said switch is operated and said contacts are electrically connected and an arc may be established between the movable electrode and the work.

4. In an arc welding system including a movable electrode and a source of current having a relatively high open circuit voltage, means for reducing the open circuit voltage normally applied to the movable electrode, consisting of a switch having an electromagnetic winding and having contacts disposed in the welding circuit but normally holding the said circuit open at a point such that only a portion of the open circuit voltage is on the movable electrode and means for energizing said switch winding to close said contact by the application thereto of a part of the open circuit voltage just previous to drawing the arc by the movable electrode.

5. In an arc welding system including a movable electrode and a source of current having a relatively high open circuit voltage, means for reducing the open circuit voltage normally applied to the movable electrode, consisting of a switch having an electromagnetic winding and having contacts disposed in the welding circuit but normally holding the said circuit open at a point such that only a portion of the open circuit voltage is on the movable electrode and means for energizing said switch winding to close said contact on applying the movable electrode to the work previous to striking the arc.

6. In an arc welding system including a movable electrode and a source of current having a relatively high open circuit voltage the greater part of which is generated by two different portions of said source and means for preventing the voltage generated by one of said portions from reaching the movable electrode when not in use.

7. In an arc welding system including a movable electrode and a source of current having a relatively high open circuit voltage the greater part of which is generated by two different portions of said source and electrically actuated means controlled by the operator for preventing the voltage generated by one of said portions from reaching the movable electrode.

8. In an arc welding system, a transformer for supplying power to said system, said transformer having main and auxiliary secondary windings each having a terminal connected into a welding circuit including arc electrodes and means for preventing the no load voltage generated by one of the said windings from being applied to said arc electrodes when the welding operation is suspended.

9. In an arc welding system, a transformer for supplying power to said system, said transformer having main and auxiliary secondary windings each having a terminal connected into a welding circuit including arc electrodes and means for preventing the no load voltage generated by the auxiliary winding from being applied to said arc electrodes when the welding operation is suspended.

10. In an arc welding system, a transformer for supplying power to said system, said transformer having main and auxiliary secondary windings adapted to be connected into a welding circuit including arc electrodes, means for normally separating the connection between said windings whereby only a part of the no load secondary voltage is applied to the welding electrodes when the welding operation is suspended.

11. In an arc welding system, a transformer for supplying power to said system, said transformer having main and auxiliary secondary windings adapted to be connected into a welding circuit including arc electrodes, means for normally separating the connection between said windings whereby only a part of the no load secondary voltage is applied to the welding electrodes when the welding operation is suspended, said means being controlled in its operation at one of said electrodes.

12. In an arc welding system, a transformer for supplying power to said system, said transformer having main and auxiliary secondary windings adapted to be connected into a welding circuit including arc electrodes, an electromagnetically controlled switch separating the connection between said windings whereby only a part of the no load secondary voltage is applied to the welding electrodes when the welding operation is suspended.

13. In an arc welding system, a transformer for supplying power to said system, said transformer having main and auxiliary secondary windings adapted to be connected into a welding circuit including arc electrodes, an electromagnetically controlled switch separating the connection between said windings whereby only a part of the no load secondary voltage is applied to the welding electrodes when the welding operation is suspended, said switch being controlled in its operation at one of said electrodes.

14. In an arc welding system utilizing alternating current at the welding electrodes wherein the arc is sustained by the combination of at least two voltages which during the welding operation are displaced in phase relation one to the other and which during the suspension of the welding operation are substantially in phase and additive to produce a relatively high no load voltage, means for preventing the application of said high voltage to the electrodes during said suspended period of welding.

15. In an arc welding system utilizing alternating current at the welding electrodes wherein the arc is sustained by the combination of at least two voltages which during the welding operation are displaced in phase relation one to the other and which during the suspension of the welding operation are substantially in phase and additive to produce a relatively high no load voltage, an electromagnetic switch controlled by the operator at one of the electrodes for preventing the application of said high voltage to the electrodes during said suspended period of welding.

16. In an arc welding system utilizing alternating current at the welding electrodes wherein the arc is sustained by the combination of voltages which during the welding operation are displaced in phase relation one to the other and which during the suspension of the welding operation are additive to produce a relatively high no load voltage, an electromagnetic switch controlled by the operator for separating the system at a point such that only a portion of the total voltage is present at the welding electrodes during the suspension of the welding operation.

17. In an arc welding system utilizing alternating current at the welding electrodes wherein the arc is sustained by the combination of voltages which during the welding operation are displaced in phase relation one to the other and which during the suspension of the welding operation are additive to produce a relatively high no load voltage, means controlled by the operator at one of the electrodes for separating the system at a point such that only a portion of the said high voltage is present at the welding electrodes during the suspension of the welding operation.

18. In an arc welding system utilizing alternating current at the welding electrodes wherein the arc is sustained by the combination of voltages which during the welding operation are displaced in phase relation one to the other and which during the suspension of the welding operation are additive to produce a relatively high no load voltage, an electromagnetic switch operated by current from said alternating current source for separating the system at a point such that only a portion of the total voltage is present at the welding electrode during the suspension of the welding operation, said switch being operated to close the system for welding on joining the electrodes previous to striking the arc.

In testimony whereof I affix my signature.

CLAUDE J. HOLSLAG.